(12) United States Patent
Yount et al.

(10) Patent No.: US 7,622,085 B2
(45) Date of Patent: Nov. 24, 2009

(54) BAFFLE ASSEMBLY MODULE FOR VERTICAL STAGED POLYMERIZATION REACTORS

(75) Inventors: Thomas Lloyd Yount, Kingsport, TN (US); Paul Keith Scherrer, Johnson City, TN (US); Larry C Windes, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 12/201,013

(22) Filed: Aug. 29, 2008

(65) Prior Publication Data

US 2008/0319158 A1    Dec. 25, 2008

Related U.S. Application Data

(62) Division of application No. 11/122,376, filed on May 5, 2005, now Pat. No. 7,435,393.

(51) Int. Cl.
*B01J 19/00* (2006.01)
*C08G 63/00* (2006.01)
*C08G 67/00* (2006.01)
*C08G 69/00* (2006.01)

(52) U.S. Cl. .................................... 422/131; 528/271
(58) Field of Classification Search ................. 422/131; 528/271; 436/174
See application file for complete search history.

(56) References Cited

U.S. PATENT DOCUMENTS

| | | |
|---|---|---|
| 2,645,607 A | 7/1953 | Allen |
| 3,250,747 A | 5/1966 | Mitchell, Jr. et al. |
| 3,841,836 A | 10/1974 | Lunsford, Jr. et al. |

(Continued)

OTHER PUBLICATIONS

Notification of Transmittal of the International Search Report and the Written Opinion of the International Searching Authority, or the Declaration date of mailing Sep. 5, 2006 on the corresponding PCT application.

*Primary Examiner*—Walter D Griffin
*Assistant Examiner*—Natasha Young
(74) *Attorney, Agent, or Firm*—Michael K. Carrier; Bernard J. Graves, Jr.

(57) ABSTRACT

The present invention provides an assembly for use in vertical, gravity flow driven polymerization reactors for combinations of high viscosity, high throughput, and shallow polymer depths. The baffle assembly module of the invention includes a support structure having a plurality of side openings. The side openings allow the escape of vapor liberated from the polymeric melt. The assembly further includes a feed splitter followed by two or more vertically arranged rows of baffle plates with the feed splitter and baffles sequentially positioned in the support structure. The plurality of parallel baffles in a row are angled such that when a polymeric melt contacts a given baffle the polymeric melt moves in a downward direction under the force of gravity. The arrangement of the rows is such that each row (except the lowest row) transfers the polymeric melt to a lower vertically adjacent row until reaching the last row of baffles in the module. According to the vertical arrangement of the components in the baffle assembly module and by stacking additional baffle assembly modules if needed within the reactor, the polymeric melt cascades down the vertical length of the reaction vessel interior. The present invention also provides a polymerization reactor that incorporates the assembly of the invention and a method of increasing the degree of polymerization of a polymer melt by using the assembly of the invention.

10 Claims, 6 Drawing Sheets

U.S. PATENT DOCUMENTS

| | | |
|---|---|---|
| 4,007,022 A | 2/1977 | Schleicher et al. |
| 4,196,168 A | 4/1980 | Lewis |
| 5,464,590 A | 11/1995 | Yount et al. |
| 5,466,419 A | 11/1995 | Yount et al. |
| 5,800,791 A | 9/1998 | Ainscow et al. |
| 7,537,627 B2 * | 5/2009 | Scherrer ............... 55/440 |
| 2006/0251547 A1 * | 11/2006 | Windes et al. ............ 422/131 |
| 2007/0266854 A1 * | 11/2007 | Scherrer ............... 95/267 |

* cited by examiner

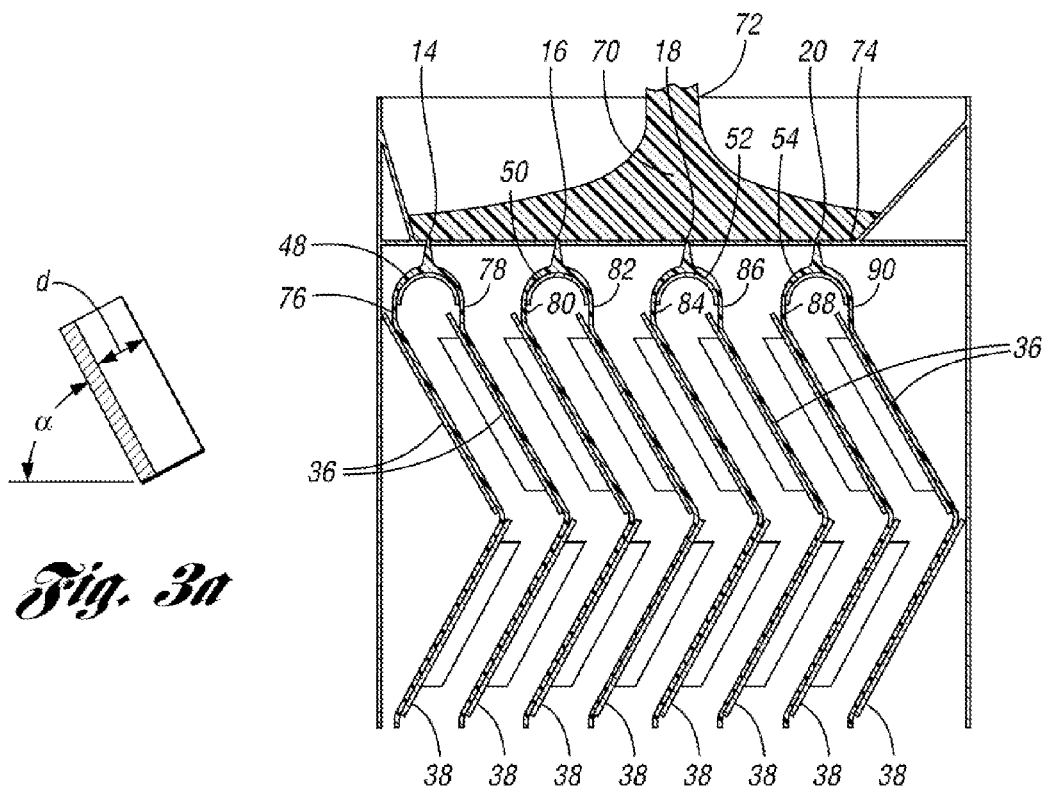
Fig. 3a
Fig. 3b
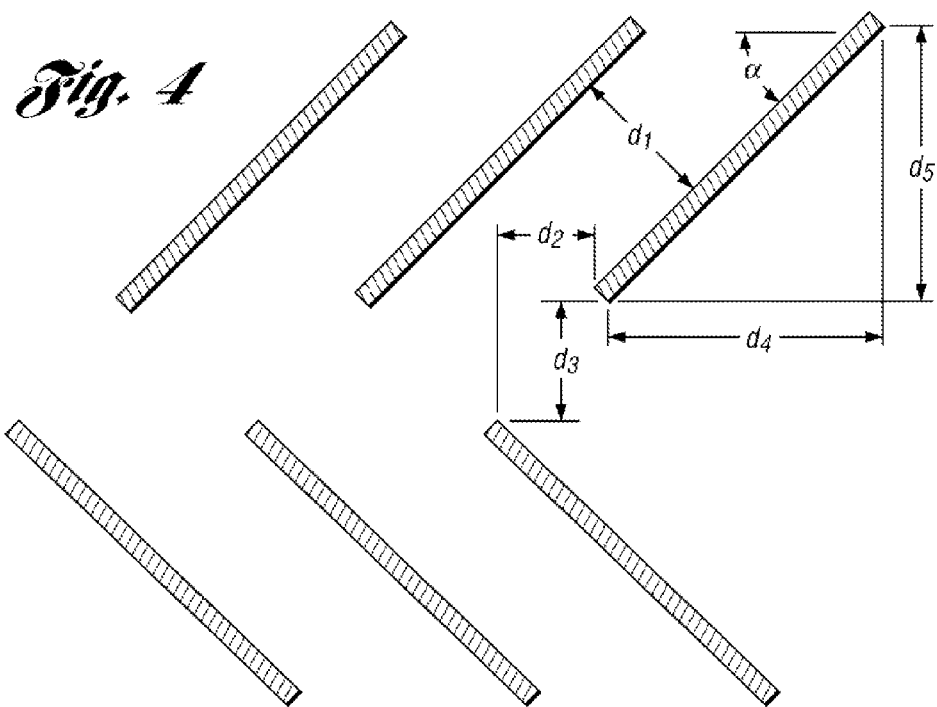
Fig. 4

BAFFLE ASSEMBLY MODULE FOR VERTICAL STAGED POLYMERIZATION REACTORS

CROSS-REFERENCE TO RELATED APPLICATION

This application is a divisional of U.S. patent application Ser. No. 11/122,376 filed on May 5, 2005, the disclosure of which is incorporated herein by reference in its entirety.

BACKGROUND OF THE INVENTION

1. Field of the Invention

The present invention relates to an apparatus for the production of polycondensation products, such as linear polyesters and co-polyesters. More particularly, the present invention relates to improved reactor internal components designs for use in vertical oriented polymerization reactors.

2. Background Art

Processes for producing polymeric materials such as polyesters and co-polyesters via polycondensation reactions involve the liberation of by-products as the polymeric functional groups of the molecules react with one another to produce longer molecular chain molecules. Typically, the extraction of these liberated by-product molecules from the reaction mixture is necessary in order to drive the molecular build-up of the polymer. If the by-product compounds were not removed, chemical equilibrium will inhibit the length of the formed polymeric chain. In many of these polycondensation reaction systems the preferred method for extracting the liberated by-product is to vaporize the by-product out of the reaction mixture.

Various reactor designs and multi-step reaction systems have been designed and operated to facilitate the vaporization of by-products and the associated production of polycondensation materials. The most economical design for such polycondensation reactions (at least for the production of low to moderate molecular weight polymeric materials) is a series of stirred tank reactors. In these reactor systems large quantities of materials can be produced that use mechanical agitation, thermosiphon reboilers, and/or simple bubble agitation to enhance heat transfer and liquid-vapor surface area renewal. Unfortunately, the viscosity of the polymeric melts increase dramatically as the degree of polymerization ("DP") increases. Accordingly, because of the practical limitations of agitator designs, the high viscosity of these materials greatly decreases the capability of renewing the liquid-vapor surfaces and hence decreases the mass transfer efficiency of the stirred tank reactor.

In addition to the features set forth above, other operating parameters may be limited in the polycondensation process. For example, higher temperatures may be desirable to increase reaction kinetics and volatility of reaction by-products. Higher volatility of the by-products decreases by-product concentration in the reaction mixture, thereby furthering the polymerization reaction. However, the temperature sensitivity of the polymeric material to degradation reactions limits the use of increasingly higher temperature as a means of furthering the degree of polymerization. Similarly, the volatility of the by-products may be further increased by the use of low operating pressures. However, use of extremely low operating pressures is limited by the cost of achieving low operating pressures and the amount of reactor vapor space needed to prevent entrainment of polymer into the vacuum source. Moreover, the depth of the polymeric pool can inhibit the effective use of the reaction volume in low pressure polycondensation reactors. Specifically, excessive depth of the reaction mixture increases the diffusion and convection paths that volatile by-products must travel before escaping. Furthermore, as the depth of the polymeric pool increases, the deeper portions of the pool are subjected to greater hydrostatic pressure. Higher local pressures within the liquid inhibit the formation of by-product bubbles, which hinders the liberation of the by-products and hence the effective use of the reaction volume for furthering polymerization.

For the reasons set forth above, increasing the degree of polymerization requires replacement of simple stirred tank reactors with specialized reaction equipment. Such specialized equipment must overcome one or more of the operating limitations above to achieve the desired degree of polymerization. Currently, there are two fundamental approaches for enhanced liquid-vapor surface renewal that are best described as the dynamic approach and the static approach.

The first approach might be termed the dynamic approach in that it involves the use of moving mechanical devices to enhance liquid-vapor surface renewal. As noted above, enhanced liquid-vapor surface renewal facilitates the liberation of the by-products. With the dynamic approach, seals are needed around the rotating shaft or shafts that pass through the reactor walls. These seals must be maintained in order to prevent air from leaking into the reactor. Also with the dynamic approach, as the size of the vessel and the viscosity of the product increase, the size of the mechanical components must increase in order to handle the increase in load. The second approach can be referred to as the static approach in that no moving devices are used for the liquid-vapor surface renewal. This later approach uses gravity in combination with vertical drop to create thin polymeric films. Typically, such polymeric films flow between trays during the vertical drop. The thin polymeric films combined with shearing and surface turnover effects created by vertical falling films drive the polymerization reaction by enhancing the liberation of by-products.

Prior art patents which disclose the use of gravity in combination with vertical drop include: U.S. Pat. No. 5,464,590 (the '590 patent), U.S. Pat. No. 5,466,419 (the '419 patent), U.S. Pat. No. 4,196,168 (the '168 patent), U.S. Pat. No. 3,841, 836 (the '836 patent), U.S. Pat. No. 3,250,747 (the '747 patent), and U.S. Pat. No. 2,645,607 (the '607 patent). Early tray designs used vertically spaced circular trays (full circle in combination with hollow circle, and segmented circular) that utilized most of the cross-sectional area of the vessel. These circular tray reactors use a large portion of the available pressure vessel's horizontal cross-section for liquid hold-up. In some designs, a circular tray was followed by a hollow circle tray thus forming a disc-and-doughnut arrangement. Thus, polymer flowed over a circular edge as it passed from tray to tray. The liberated gas by-product thus flowed through circular and annular openings. In other designs, the trays were segmented to provide a straight edge for the polymer to flow over before dropping to the next tray. The segmented tray design also provided open area between the straight edge over which the polymer flowed and the vessel wall through which the gas by-product could pass. With both designs however, the vaporized by-products from the trays were forced to flow through the same space as the polymer melt flow. To address this concern, the diameter of the circular trays was made somewhat less than the reactor vessel's diameter. The resulting annular space was used to allow vapor traffic to escape each tray and travel to the reactor vessel's vapor discharge nozzle along a path external to the path of the polymer flow. A shortcoming of the simple circular tray designs is the existence of very slow moving or stagnant regions on the trays.

The polymer in these stagnant regions tend to overcook, become excessively viscous, cross-link and/or degrade, and as a result slowly solidify. The net result is a loss of effective reaction volume.

The next generation of designers changed the shape of the trays from circular to other geometric shapes. They eliminated dead zones which are not entirely effective as reaction volume. The elimination of dead zones also improved product quality since the dead zones are regions which produce high levels of degradation products due to the overcooking of the polymer. Unfortunately, these non-circular-shaped trays did not increase the effective use of the cylindrical pressure vessel's cross-sectional area.

The basis for more recent inventions of the '590 patent and the '419 patent is a hollow circular tray which more efficiently utilizes the cross-sectional area of a cylindrical pressure vessel while providing polymer melt flow paths which minimizes liquid dead zone regions and prevent channeling. The net result was an approximate 40% increase in tray area available for liquid retention as compared to the non-circular shaped trays. The central opening in the trays provided a chimney through which the vapor by-products are removed.

However, as set forth above, the depth of the polymeric pools can also inhibit the effective use of the reaction volume at low operating pressures. At a given operating pressure (vacuum level), the negative impact of the deeper polymer depth increases in proportion to the degree of polymerization. This is due to reduction of the chemical equilibrium driving force for polymerization as the concentration of polymer end groups are reduced through the growth of the polymer chains. Hence, to get acceptable results, the mechanisms for liberating polycondensation by-products from the polymer melt must be further enhanced. At higher degrees of polymerization this is necessary so that sufficiently low levels of by-products remain in the melt enabling the polymerization to proceed efficiently. However, another important factor is that viscosity increases substantially as polymerization proceeds to higher degrees of polymerization.

At a sufficiently high viscosity, tray designs which utilize essentially horizontal trays cannot achieve the desired combination of both high polymer throughput and shallow polymer depths. The designs of Lewis et al. in the '168 patent achieve a degree of control over the polymer depth by having the polymer flow down sloping trays. The slopes of the successive trays are increased to account for the expected increasing viscosity of the polymer as it polymerizes along its course. The inventions claimed in the '168 patent are extensions of those sloped tray designs for polymer systems with higher throughputs, even higher viscosities, and/or shallower operating depths.

The design of the '168 patent (roof-and-trough trays) also achieved some degree of control over polymer depth by splitting the polymer flow into two equal streams (with one flow path being a mirror image of the other flow path) that traverse from the top to the bottom of the reactor over sloped trays. The '168 patent design innovation over simple sloped trays was a reduction of the reactor vessel volume needed to enclose the trays within a vacuum environment. By splitting the polymer flow the vertical dimension (vertical drop) needed for a tray to achieve a desired slope and hence a desired polymer depth was reduced. The roof-and-trough configuration cuts the horizontal length of the tray that each half of the polymer flow must traverse before dropping to the next tray. Since each half of the polymer flow traverses half the horizontal distance, the residence time for each is approximately the same as a simple sloped tray while using less total vertical height.

As the production rates are increased, the roof-and-trough design concept can be extended by splitting the polymer streams into more equal streams, generally in binary fashion—two, four, eight . . . . Thus, good utilization of the reactor vessel volume is maintained as the vessel increases in size to accommodate the polymer throughput.

However, even with the roof-and-trough tray design of Lewis, utilization of the reactor vessel volume decreases as the desired degree of polymerization is pushed higher and/or the mass transfer versus residence time operating window is narrowed to achieve better quality. As the targeted degree of polymerization is pushed higher, the polymer viscosity increases. Thus, to maintain the same polymer depth requirements steeper tray slopes are required. Similarly, if mass transfer is to be increased by targeting shallow polymer depths, then steeper trays are needed. At some point the slopes become essentially vertical (greater than 60° slope from horizontal) and appreciably thinner depths for a given combination of throughput and viscosity cannot be achieved by further changing the slope. In this region of high throughputs, targeted shallow depths, and high viscosity, the baffle assembly modules of the present invention described herein increase the number of polymer sheets within a given reactor vessel cross-sectional area, thereby achieving high throughputs and better mass transfer.

Accordingly, there is a need for improved tray designs for polycondensation reactors that make more efficient utilization of space in a vertical, gravity flow driven polymerization reactor for combinations of high viscosity, high throughput, and shallow polymer depths.

SUMMARY OF THE INVENTION

The present invention overcomes one or more problems of the prior art by providing in one embodiment a baffle assembly module of static internal components for a vertical, gravity flow driven polymerization reactor for combinations of high viscosity, high throughput, and thin polymer melt films. The present invention is an enhancement of earlier designs that also used the approach of gravity and vertical drop to achieve the desired degree of polymerization. Such earlier designs are disclosed in U.S. Pat. No. 5,464,590 (the '590 patent), U.S. Pat. No. 5,466,419 (the '419 patent), U.S. Pat. No. 4,196,168 (the '168 patent), U.S. Pat. No. 3,841,836 (the '836 patent), U.S. Pat. No. 3,250,747 (the '747 patent), and U.S. Pat. No. 2,645,607 (the '607 patent). The entire disclosures of these patents are hereby incorporated by reference. The present invention provides increased surface areas over which the liquid is in contact with the atmosphere of the reactor, while still attaining sufficient liquid holdup times for the polymerization to take place, by means of the novel arrangement of the components comprising the baffle assembly module. The baffle assembly module of the invention includes a stationary feed splitter and stationary arrays of baffles or trays mounted in a support structure. The feed splitter is any device that subdivides a flowing polymer stream into two or more independently flowing streams with a resultant increase in the number of free surfaces. By dividing the polymer melt, it can be more uniformly applied to the array of baffles located below it. Typically, the baffles (trays) in the array are arranged in rows with the baffles in a row at constant elevation (i.e., height).

The array of baffles provides solid surfaces upon which the polymer streams from the feed splitter flow. The baffles (trays) are usually oriented at least 10 degrees from the horizontal plane. A row of baffles can be formed by mounting at an equal elevation a plurality of horizontally spaced parallel plates. For such an array, the linear or normal spacing between adjacent baffles in a row is preferably constant.

Two or more rows of baffles (trays) are vertically arranged within the baffle assembly module. The vertically arranged rows of baffles in the baffle assembly module typically have a highest positioned row, a lowest positioned row, and optionally one or more intermediately positioned rows. In turn, each row includes one or more baffles that are positioned such that when the polymeric melt contacts a baffle the polymeric melt moves in a downward direction under the force of gravity. Furthermore, the baffles in each row are arranged in a parallel fashion. The arrangement of the rows of baffles in the baffle assembly modules are such that each row (except the lowest row) transfers the polymeric melt to a lower vertically adjacent subsequent row of baffles. According to the vertical arrangement of the components in the baffle assembly module and by stacking additional baffle assembly modules if needed within the reactor, the polymeric melt cascades down the vertical length of the reaction vessel interior.

The reactor vessel provides a means for controlling both the pressure and temperature in the space surrounding the baffle assembly modules. The baffle assembly modules are mounted in the vessel to provide retention of the polymer melts, thereby increasing liquid residence time within the reactor and its exposure to the reaction conditions. The liquid residence time is required to allow sufficient time for the polymerization kinetics to keep up with the enhanced by-product liberation rates achieved by the increase in the liquid-vapor surface area and the enhancement of its renewal. Not only does this design provide more free surface area for the polymer melt, it also provides more parallel flow paths so that the depth of the polymer on the baffles is reduced.

The presence of a feed splitter atop a baffle assembly module facilitates changing the number or orientation of the baffles (trays) from one module to a subsequently lower module.

BRIEF DESCRIPTION OF THE DRAWINGS

FIG. 3a is a side view of a baffle section with a polymer melt flowing thereon;

FIG. 3b is a schematic illustrating the flow of polymer melt through the feed splitter and onto the subsequent baffles in the assembly of the invention;

FIG. 4 is a diagram showing the spatial relationship between the baffles used in the baffle assembly module of the invention;

FIG. 5a is an illustration demonstrating a mechanism in which polymer melt flow may miss a baffle;

FIG. 5b is an illustration demonstrating the use of baffle extensions to prevent the polymer flow missing a baffle (as shown in FIG. 5a);

FIG. 5c is an illustration demonstrating discontinuous polymer melt flow on a baffle;

FIG. 5d is an illustration demonstrating the use of baffle extensions to prevent discontinuous polymer flow (shown in FIG. 5c);

DETAILED DESCRIPTION OF THE PREFERRED EMBODIMENT(S)

Figure 1A:
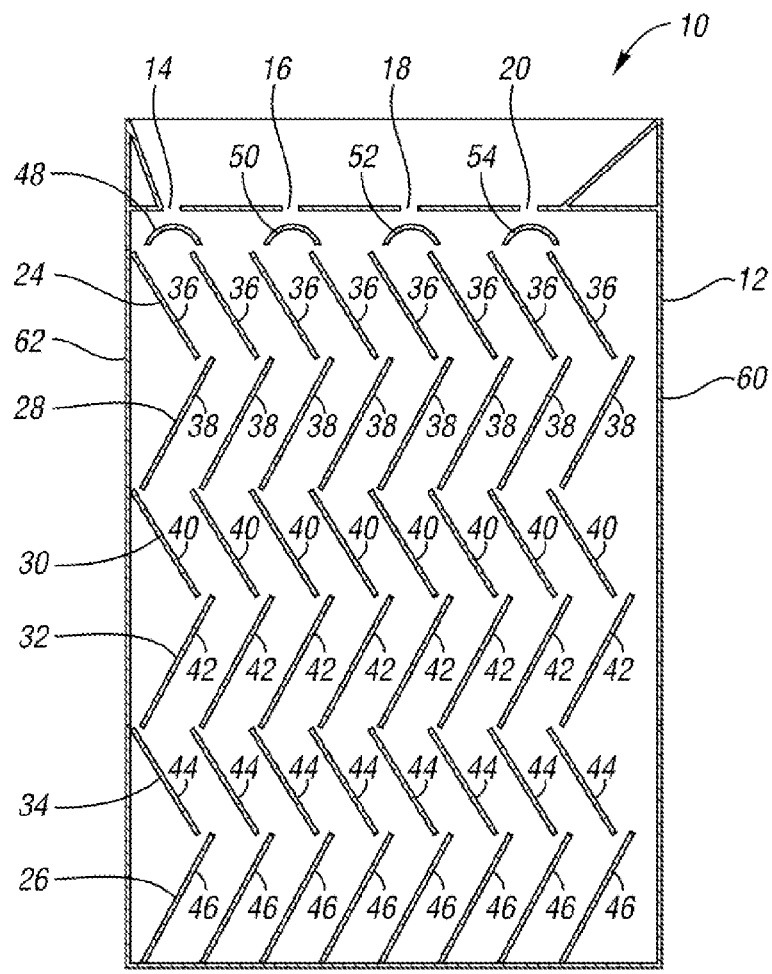
FIG. 1a is a cross-sectional view of one embodiment of the baffle assembly module of the present invention showing feed splitters and a subsequent array of parallel baffles in a support structure.
Figure 1B:
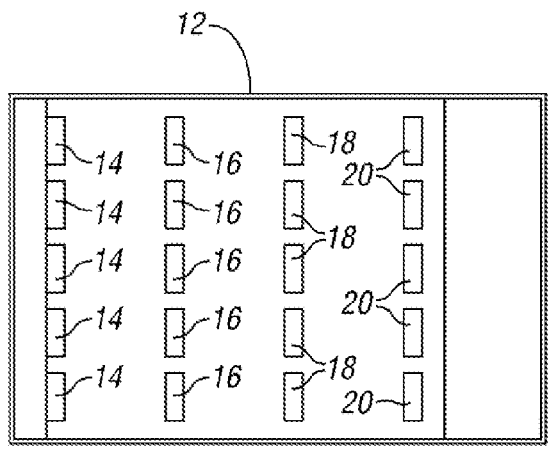
FIG. 1b is a top view of the feed splitter box atop a baffle assembly module of the present invention.
Figure 2A:
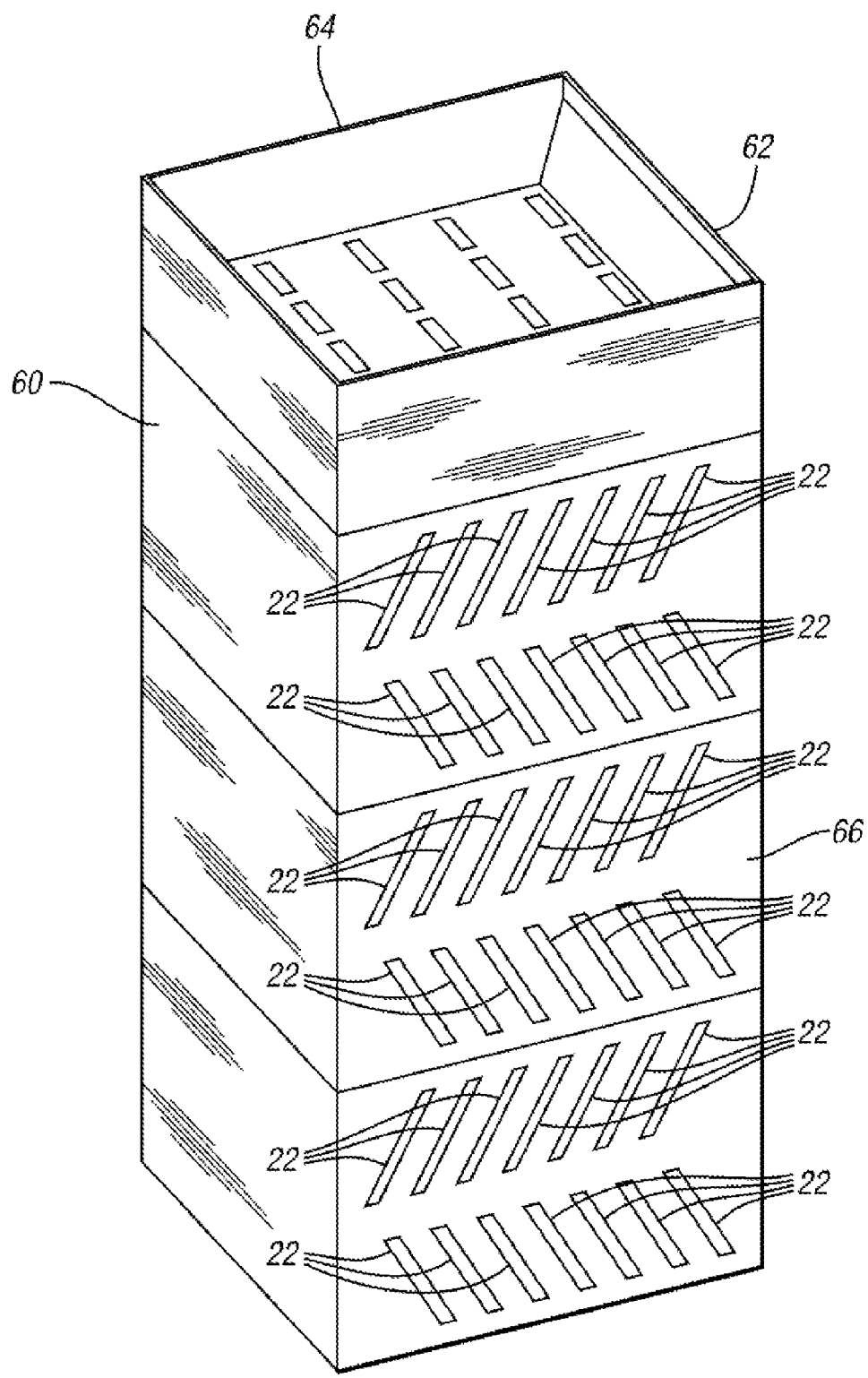
FIG. 2a is a perspective view of a baffle assembly module of the present invention.
Figure 2B:
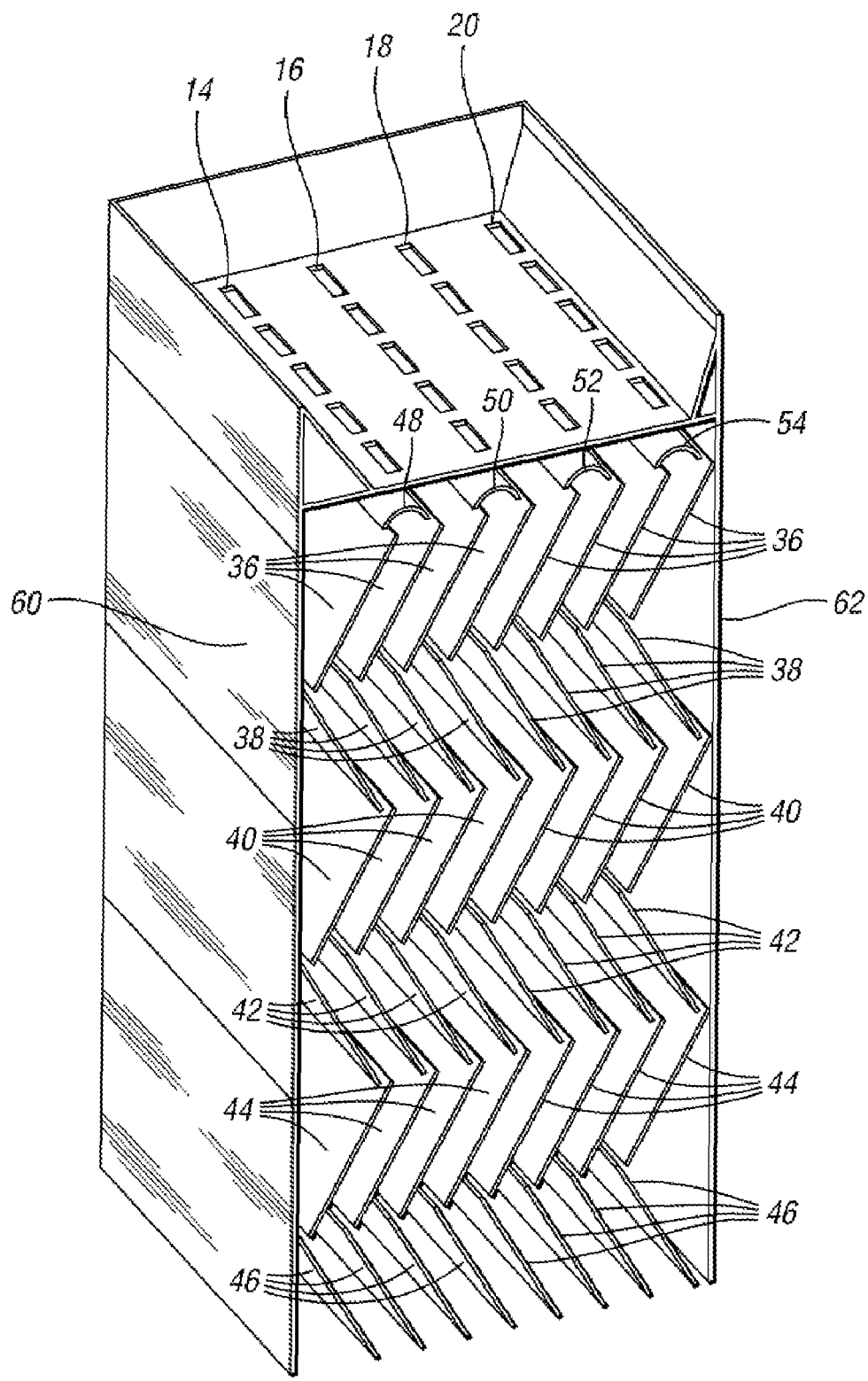
FIG. 2b is a perspective view of a baffle assembly module of the present invention with one wall of the support structure removed to expose the internal baffle arrangement.

Reference will now be made in detail to the presently preferred compositions or embodiments and methods of the invention, which constitute the best modes of practicing the invention presently known to the inventors.

In an embodiment of the present invention, an assembly adapted to be placed in a reactor for polymerizing a polymeric melt is provided. With reference to FIGS. 1a, 1b, 2a, and 2b, the baffle assembly module 10 consists of a stationary feed splitter and stationary baffles mounted in a support structure 12. The feed splitter and baffles are referred to as stationary because they do not have moving parts nor do they move during operation.

The baffle assembly module 10 includes a row of baffles 24 which is the highest vertically positioned row and another row of baffles 26 which is the lowest vertically positioned row. The baffle assembly module 10 will also optionally include one or more intermediately positioned rows 28, 30, 32, 34. Each row of the vertically arranged rows of baffles 24-34 includes a plurality of baffles 36, 38, 40, 42, 44, 46. Typically each row has from about 8 to about 60 baffles. Moreover, each baffle of the plurality of baffles 36-46 are angled and biased in the same direction such that when the polymeric melt contacts a baffle of the plurality of baffles 36-46, the polymeric melt moves in a downward direction under the force of gravity. In this context, biased in the same direction means that each baffle of the plurality of baffles for a given row directs the polymer melt flow in the same sense, i.e., when observing the baffles from the ends, the flow for each baffle in the row is either from left to right or right to left. Alternatively stated, the baffles in each row are either substantially parallel, or else no two baffles in a row have a relative angle between them that is greater than 90 degrees. Moreover, each row of vertically arranged rows 24-34, except the lowest positioned row, transfers the polymeric melt to a lower vertically adjacent row. Furthermore there is consistent clearance between the baffles in a row. "Consistent clearance" as used in this context means that the baffles are separated by a sufficient distance to prevent polymer melt 46 from bridging the gap between adjacent baffles in a row.

The feed splitter is any device that can be used to uniformly subdivide the polymer flow onto the baffles. A feed splitter can be formed from a plate by adding appropriately positioned openings. Also, arrays of rods, bars, pipes, half-pipes and angles can be easily arranged to form the feed splitter.

The baffle assembly module 10 includes a feed splitter box which splits the flow using a perforated plate. After flowing through rows of flow dividing ports 14, 16, 18, and 20; the polymer melt impinges onto additional flow dividers 48, 50, 52, 54. These additional dividers 48, 50, 52 and 54 are needed when the number of rows of dividing ports 14, 16, 18 and 20 is equal to half the number of baffles in a row. The dividers 48, 50, 52 and 54 as shown are made from a semi-circular plate (half-pipe). It should be appreciated however that other shapes such as a bent plate (i.e. "angle") can also be used. The support structure 12 typically includes a first pair of opposing sides 60, 62 and a second pair of opposing sides 64, 66. Rows of baffles 24-34 are situated between the first pair of opposing sides 60, 62 and each baffle of the baffle rows 24-34 is disposed between the second pair of opposing sides 64, 66. Moreover, the second pair of opposing sides 64, 66 includes the plurality of openings 22 adapted to allow escape of vapor liberated from the polymeric melt.

With reference to FIG. 3, a schematic illustrating the flow of the polymer melt in the baffle assembly module of the present invention is provided. Polymer melt 70 is introduced at the top of the baffle assembly module 10 entering through port 72. The polymer flows down onto plate 74. Polymer melt 70 then flows through rows of dividing ports 14, 16, 18, and 20 which are located in plate 74. The flow through rows of dividing ports 14, 16, 18, 20 acts to divide the flow of polymer melt 70. Polymer melt 70 then impinges on flow dividers 48, 50, 52, 54 which further divide the flow into flow streams 76, 78, 80, 82, 84, 86, 88, 90 which flow onto each of baffles 36 of the uppermost row 24. Polymer melt 70 then proceeds to flow down baffles 36 and then onto baffles 38 with each of flow streams 76-90 flowing on to the nearest baffle of baffles 38. This process repeats for each row of baffles until reaching the lowest row of baffles 46. The baffles 36-46 in each of rows 24-34 are angled by angle α as measured from a horizontal plane when viewed from the side. Typically, α is from about 10 degrees to about 80 degrees as measured from a horizontal plane. Furthermore, when viewed from the side, a given row of baffles will direct the flow of polymer melt 70 downward either from left to right or from right to left. Moreover, in each row, the sense in going from left to right or right to left will alternate between adjacent rows. Another worthy aspect of this baffle (tray) design is that it maintains the polymer turnover aspects of the roof-and-trough tray design. As the polymer flows from baffle to baffle the two sides of the polymer stream in laminar flow are alternately exposed to the vapor-liquid interface. The polymer that was on the top of the polymer stream on one baffle is on the bottom of the pool against the floor of the next baffle, and vice versa, the polymer which had been on the bottom of the stream is on top of the flow stream and exposed to the vapor on the next baffle. However, each baffle of a given row 24-34 will direct the flow in the same sense. Therefore, typically each baffle of a given row of rows 24-34 will be substantially parallel. Non-parallel baffles are also within the scope of the invention so long as the directional sense of all baffles within one row is the same.

The relationship of the thickness of flow streams 76-90 to the baffle or tray geometry and fluid physical properties is approximated by equation I:

$$(3F\mu)/(\rho g d^3) = WN \sin(\alpha) \qquad \text{I}$$

where F is the total mass flow of polymer through the reactor, g is the acceleration due to gravity, d is the thickness of the polymer melt as shown in FIG. 3a, μ is the polymer melt dynamic viscosity, ρ is the polymer melt density, W is the width of the baffles, N is the number of baffles in a row, and α is the angle defining the slope of the baffles with respect to a horizontal plane. Typically, the angle α will be from about 10 degrees to about 80 degrees with respect to a horizontal plane.

With reference to FIG. 4, a diagram illustrating the layout of the baffles is provided. For a given α, $d_1$ is the perpendicular distance between each baffle within a single row, $d_2$ is the distance of horizontal offset between vertically adjacent rows of baffles, $d_3$ is the vertical offset or gap between adjacent rows of baffles, $d_4$ is the horizontal span of each baffle, and $d_5$ is the vertical drop for each baffle. Distance $d_1$ is typically from about 1 inch to about 10 inches. In other variations, $d_1$ is from about 2 inches to about 8 inches. In still other variations, $d_1$ is from about 4 inches to about 5 inches. Typically, the distance between each baffle of the plurality of baffles is such that when the polymeric melt flows through the baffle assembly module, during steady state operation, the polymeric melt is of a thickness of at least 10% of the distance between adjacent baffles in a row. Typically, $d_2$ is from about 1 inch to about 5 inches, $d_3$ is from about 0 inches to about 6 inches, $d_4$ is from about 4 inches to about 48 inches, and $d_5$ is from about 4 inches to about 48 inches. In other variations, $d_2$ is from about 2 inches to about 4 inches, $d_3$ is from about 1 inch to about 3 inches, $d_4$ is from about 6 inches to about 12 inches, and $d_5$ is from about 8 inches to about 24 inches. In other variations, during steady state operation, the polymeric melt is of a thickness of at least 20% of the distance between adjacent baffles in a row. In still other variations, during steady state operation, the polymeric melt is of a thickness of at least 40% of the distance between adjacent baffles in a row.

Figure 5E:
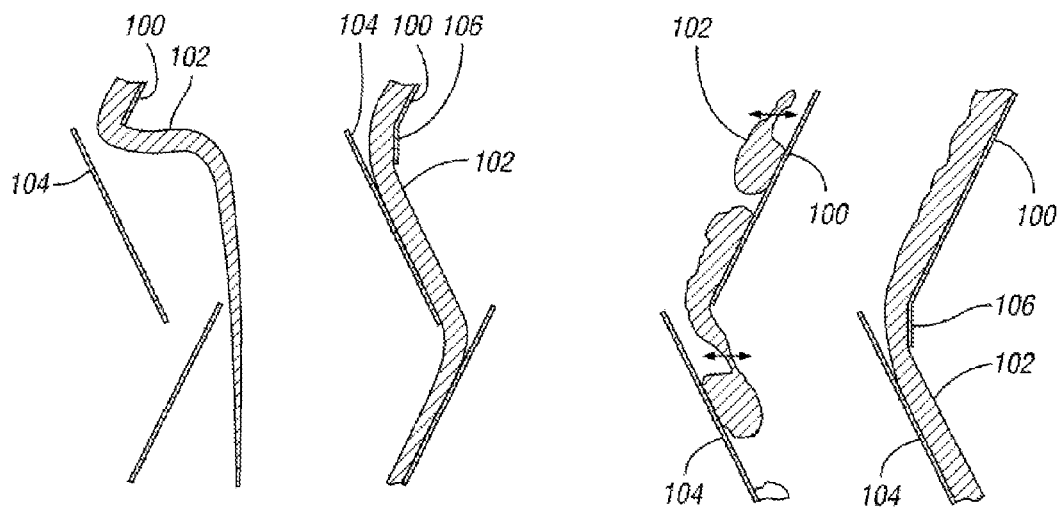
FIG. 5e is an illustration demonstrating the reduction in the width of the polymer sheet as it falls between baffles.
Figure 5E:
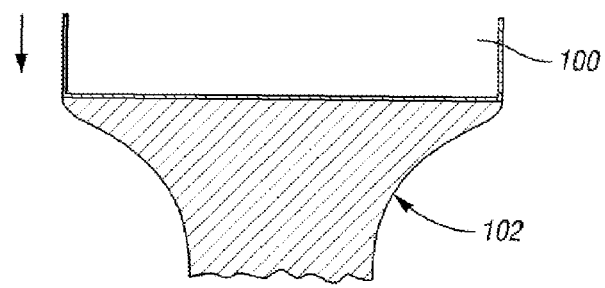
Figure 5F:
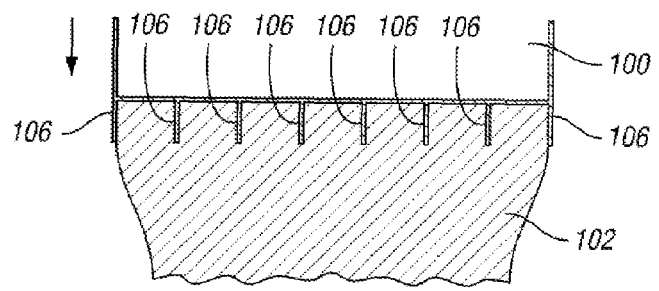
FIG. 5f is an illustration demonstrating the use of baffle extensions to minimize the reduction in the polymer sheet width (as shown in FIG. 5e)

In a variation of the present invention, one or more baffle extensions are attached to the bottom edge of each baffle that transfers polymeric melt to a subsequent vertically positioned baffle. With reference to FIGS. 5a-f, schematics illustrating the effect of baffle extensions on the polymer melt flow are provided. In FIG. 5a, baffle 100 is designed to transfer polymer melt 102 to baffle 104. However, under certain conditions without any baffle extensions on the end of baffle 100, there is a potential that polymer melt 102 might skip over baffle 104. This is due to the fact that as the polymer flows down a baffle, the liquid on the exposed top surface is moving faster than the polymer flowing along the floor formed by the baffle. Accordingly, as the polymer flow reaches the bottom of the baffle it tends to curve back toward the baffle floor from which the polymer is leaving. Usually, this does not result in a tremendous amount of horizontal movement. However, since the baffle below is sloping in the same direction on a steep angle, the polymer can hit this next lower baffle some distance down the length of the baffle or skip the baffle entirely. In FIG. 5b, baffle 100 includes one or more baffle extensions 106 that help direct the flow onto baffle 104 as illustrated. Thus, baffle extensions consisting of rods or fingers extending from the bottom edge of the baffles (trays) is an enhancement of this invention. The spacing of the rods or fingers depends on the expected viscosity and flow rate of the polymer. The fingers extend down vertically from the baffle to which they are attached but stop short of the expected height of the polymer depth on the next lower baffle. With these fingers the polymer sheet from a baffle is directed to the subsequent baffle to utilize more of the subsequent baffle surface area.

With reference to FIG. 5c, another non-optimal polymer melt flow that may occur without baffle extension is illustrated. In this scenario, polymer melt 102 is observed to flow in a discontinuous manner ("snowball") in proceeding down baffle 100 and hence from baffle 100 to baffle 104. At the location where the falling material 102 contacts baffle 104, there is some folding of the material on top of itself. The extent of this folding in combination with the slope of baffle 104 can result in the discontinuous flow shown. FIG. 5d illustrates how baffle extensions 106 remedy this situation by reducing the extent that folding occurs.

With reference to FIG. 5e an end-on view of polymer melt 102 flowing from baffle 100 is provided. In the absence of baffle extensions the width of the falling film is reduced as the polymer melt 102 is pulled towards the middle of baffle 100. As demonstrated in FIG. 5f, baffle extensions 106 tend to mitigate this effect. Typically, the one or more baffle extensions comprise a plurality of rod-like protrusions extending from a bottom edge of each baffle.

Figure 6A:
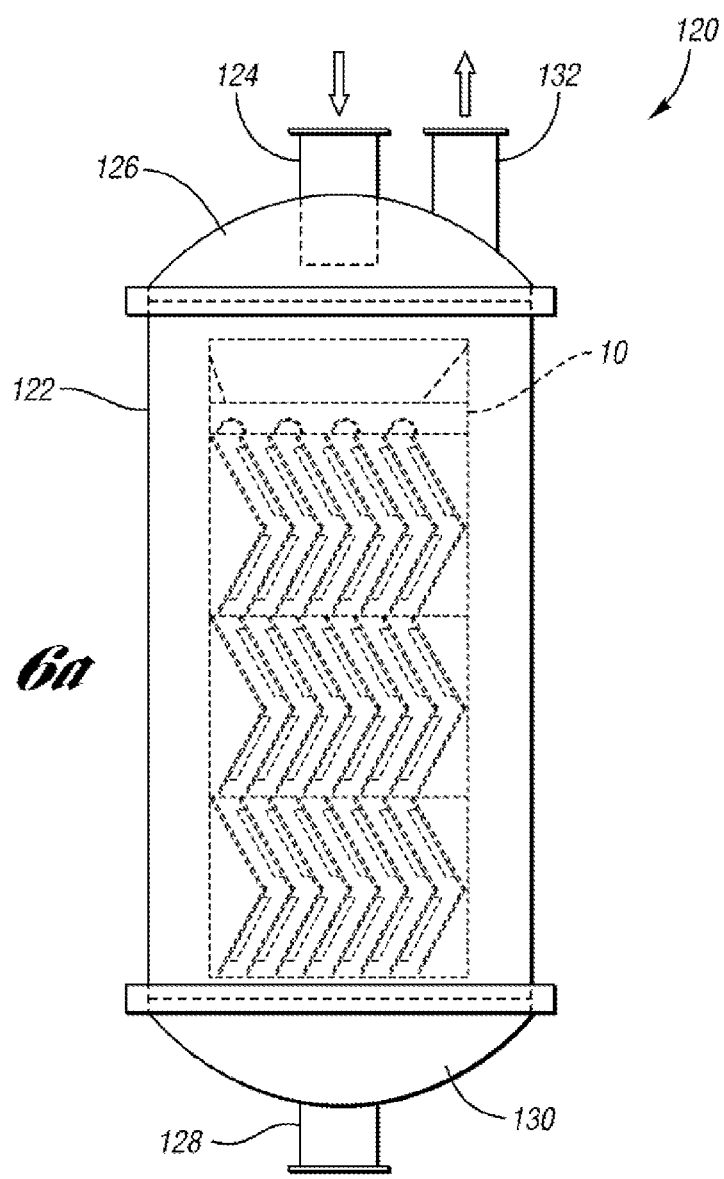
FIG. 6a is a side view of a polymerization reactor composed of a vessel which encloses a baffle assembly module of the present invention.
Figure 6B:
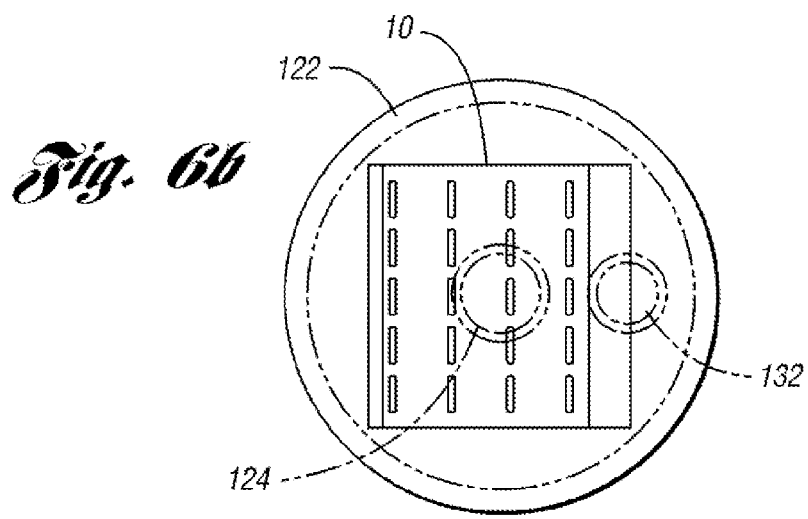
FIG. 6b is a top view of a polymerization reactor containing a baffle assembly module of the present invention showing a polymer inlet nozzle and polymer outlet nozzle as well as a nozzle for gas removal.

In another embodiment of the present invention, a polymerization reactor that utilizes the one or more baffle assembly modules set forth above is provided. With reference to FIGS. 1 and 6, polymerization reactor 120 includes baffle assembly module 10 and vertically disposed containment 122. Polymeric melt inlet 124 is attached near the top 126 of outer shell 122 and polymeric melt outlet 128 attached is attached near the bottom 130 of outer shell 122. Moreover, polymerization reactor 120 also includes vapor outlet 132 attached to outer shell 122. Finally, the polymerization reactor 120 includes the baffle assembly module 10 which receives the polymeric melt from polymeric melt inlet and transfers the polymeric melt to the polymeric melt outlet 128, as set forth above. In another variation of this embodiment, additional baffle assemblies may be present in polymerization reactor 120. These additional baffle assemblies may be placed side by side baffle assembly module 10 and/or stacked below baffle assembly 10. Polymerization reactor 120 also includes a heater (not shown) for maintaining polymer melt in a fluid state and a vacuum pump (not shown) for reducing the pressure within the polymerization reactor (not shown). The vacuum pump will typically act through vapor outlet 132. Specifically, the baffle assembly module 10 includes two or more vertically arranged rows of baffles 24-34. The vertically arranged rows having a highest positioned row 24, a lowest positioned row 26, and optionally one or more intermediately positioned rows 28-34. Moreover, each row of vertically arranged rows 24-34 includes a plurality of baffles that are angled such that when the polymeric melt contacts a baffle of the plurality of baffles the polymeric melt moves in a downward direction under the force of gravity. Finally, each of the rows, except the lowest positioned row 26, is adapted to transfer the polymeric melt to a lower vertically adjacent row.

In yet another embodiment of the invention, a method of increasing the degree of polymerization in a polymeric melt using the baffle assembly module set forth above is provided. The method of the invention comprises introducing the polymeric melt into the baffle assembly module at a sufficient temperature and pressure. The details of the assembly are set forth above. The method of this embodiment comprises splitting the polymer melt stream prior to contacting the highest positioned row of baffles with the polymeric melt. Next, the optional intermediate rows of baffles are contacted with the polymeric melt. Finally, the lowest positioned row of baffles is contacted with the polymeric melt. After passing over the lowest positioned row of baffles, the polymeric melt flows out of the baffle assembly module. The polymeric melt removed from the baffle assembly module advantageously has a higher degree of polymerization than when the polymeric melt was introduced into the assembly. In one variation of this embodiment, the reaction temperature is from about 250° C. to about 320° C., and the reaction pressure is from about 0.2 torr to about 30 torr.

In order to achieve efficient space utilization, the horizontal spacing within a row of baffles can be adapted to the melt viscosity of the liquid (i.e., polymer melt.) Thus, as the viscosity increases from the top to the bottom of the reactor, the minimum horizontal spacing may increase between the adjacent baffles in a row. As a result, the number of baffles in a row may be fewer for subsequent lower baffle assembly modules. The feed splitter design used in each module must therefore account for any changes in the number of baffles in a row. Also, a design with a feed splitter in each module facilitates changing the orientation of the baffles, for example, having the baffles in successive modules rotated 90 degrees about the reactor centerline.

It should also be appreciated that a number of baffle assembly modules may be stacked to provide a longer flow path for the polymer melt. Although the present example illustrates the use of a single module assembly, an arbitrary number of module assemblies can be utilized. The actual number of module assemblies required depends on a number of factors.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of increasing the degree of polymerization in a polymeric melt, the method comprising:
   a) introducing the polymeric melt into an assembly at a sufficient temperature and pressure to increase the degree of polymerization of the polymer melt, the assembly comprising:
   a feed splitter and two or more vertically arranged rows of baffles, the two or more vertically arranged rows having a highest positioned row of baffles, a lowest positioned row of baffles, and one or more optional intermediately positioned rows of baffles, wherein each row of the two or more vertically arranged rows includes a plurality of baffles, the plurality of parallel baffles being angled and biased in the same direction such that when the polymeric melt contacts a baffle of the plurality of baffles the polymeric melt moves in a downward direction under the force of gravity and wherein each row of the two or more vertically arranged rows, except the lowest positioned row, is adapted to transfer the polymeric melt to a lower vertically adjacent row;
   b) contacting the highest positioned row of baffles with the polymeric melt;
   c) contacting the optional intermediate rows of baffles with the polymeric melt;
   d) contacting the lowest positioned row of baffles with the polymeric melt; and
   e) removing the polymeric melt from the assembly where the polymeric melt removed from the assembly has a higher degree of polymerization than when the polymeric melt was introduced into the assembly.

2. The method of claim 1 wherein the temperature is from about 250° C. to about 320° C.

3. The method of claim 1 wherein the pressure is from about 0.2 torr to about 30 torr.

4. The method of claim 1 wherein each row of the two or more vertically positioned rows comprise a plurality of essentially parallel baffles.

5. The method of claim 1 wherein the distance between each baffle of the plurality of baffles is such that when the polymeric melt flows through the assembly during steady state operation, the polymeric melt is of a thickness of at least 10% of the distance between horizontally adjacent baffles.

6. The method of claim 1 wherein each row of the two or more vertically arranged rows, except the lowest positioned row, is adapted to transfer the polymeric melt to a lower vertically adjacent row such that each baffle transfers polymeric melt to a closest downward vertically positioned baffle.

7. The method of claim 6 wherein each baffle that transfers polymeric melt to a closest downward vertically positioned baffle further comprises one or more baffle extensions.

8. The method of claim 7 wherein the one or more baffle extensions comprise a plurality of rod-like protrusions extending from a bottom edge of each baffle, the protrusions transferring the polymeric melt to a closest downward vertically positioned baffle.

9. The method of claim 1 wherein the support structure comprises an enclosure that includes a first pair of opposing sides, and a second pair of opposing sides with the two or more vertically arranged rows of baffles disposed between the first pair of opposing sides and each baffle of the plurality of baffles disposed between the second pair of opposing sides, and wherein the second pair of opposing sides includes a plurality of openings adapted to allow escape of vapor liberated from the polymeric melt.

10. The method of claim 9 wherein the plurality of openings adapted to allow escape of vapor liberated from the polymeric melt are adjacent to gaps between two adjacent baffles of the plurality of baffles.

* * * * *